United States Patent
Makii (10) Patent No.: US 7,623,776 B2
(45) Date of Patent: Nov. 24, 2009

(54) OPTICAL APPARATUS, LENS UNIT, AND IMAGE CAPTURING APPARATUS

(75) Inventor: Tatsuo Makii, Tokyo (JP)

(73) Assignee: Sony Corporation, Tokyo (JP)

( * ) Notice: Subject to any disclaimer, the term of this patent is extended or adjusted under 35 U.S.C. 154(b) by 604 days.

(21) Appl. No.: 11/404,873

(22) Filed: Apr. 17, 2006

(65) Prior Publication Data

US 2006/0245746 A1 Nov. 2, 2006

(30) Foreign Application Priority Data

Apr. 18, 2005 (JP) .............. P2005-119845

(51) Int. Cl.
*G03B 17/00* (2006.01)
(52) U.S. Cl. ................................ 396/55
(58) Field of Classification Search .......... 396/52–55; 348/208.99, 208.5, 208.7, 208.8, 208.11, 348/208.12
See application file for complete search history.

(56) References Cited

U.S. PATENT DOCUMENTS

| | | | | |
|---|---|---|---|---|
| 5,345,264 A | * | 9/1994 | Murata et al. | 348/235 |
| 5,657,080 A | * | 8/1997 | Sekine | 348/208.5 |
| 6,603,927 B2 | * | 8/2003 | Enomoto | 396/55 |
| 7,474,843 B2 | * | 1/2009 | Miura | 396/52 |
| 2003/0030728 A1 | * | 2/2003 | Kudo | 348/208.6 |

FOREIGN PATENT DOCUMENTS

JP  2003-101866  4/2003

* cited by examiner

*Primary Examiner*—W B Perkey
(74) *Attorney, Agent, or Firm*—Rader, Fishman & Grauer PLLC (57) ABSTRACT

An optical apparatus includes: an optical imaging system having an image stabilizing lens, the image stabilizing lens being shifted in directions orthogonal to an optical axis for camera shake correction; image correcting means for making an image correction for image information captured through the optical imaging system; an imager device configured to convert the image information obtained through the optical imaging system into an electric signal; camera shake detecting means for detecting camera shake occurring at the optical imaging system; and lens drive means for shifting the image stabilizing lens in the directions orthogonal to the optical axis based on a detection result obtained by the camera shake detecting means. A center of correction to be used in the image correcting means is shifted with respect to a read image center on the imager device depending on a distance and a direction of the shifting of the image stabilizing lens.

11 Claims, 9 Drawing Sheets

OPTICAL APPARATUS, LENS UNIT, AND IMAGE CAPTURING APPARATUS

BACKGROUND OF THE INVENTION

1. Field of the Invention

The present invention relates to the technical fields of an optical apparatus, a lens unit, and an image capturing apparatus. More specifically, the present invention relates to a technical field that allows to proper adjustment of a correction process for image information without increasing an amount of correction data.

2. Description of Related Art

There are optical apparatuses equipped with a lens unit having an optical imaging system including a zoom lens and a focus lens etc., an imager device for converting image information captured through the optical imaging system into an electric signal, and the like. Such a type of optical apparatus is incorporated in various types of image capturing apparatuses, including not only video cameras and still cameras but also mobile phones etc.

Among these types of image capturing apparatuses, there are image capturing apparatuses having a function of detecting an amount of camera shake so as to prevent image quality from degradations caused by camera shake.

Images captured by such image capturing apparatuses may be influenced by various factors such as: an ambient brightness change, which is caused by a difference in the angle of each luminous flux incident on the optical imaging system, causing a reduction of the brightness as a distance from a read image center increases; a field distortion, which is caused by a lens shape of the optical imaging system, causing an increase in an amount of distortion as the distance from the read image center increases; and a chromatic aberration, which is caused by a difference in the refractive index of the optical imaging system depending on an incident light wavelength, causing changes in a relative position and a size of an image as the distance from the read image center increases.

Accordingly, the image capturing apparatuses are available with image correcting means that are intended to increase an image quality by making various corrections against the effects resulting from the ambient brightness change, the field distortion, the chromatic aberration, etc.

The image capturing apparatuses, which have the function for preventing the image quality from degradations caused by the camera shake as described above, typically perform the camera shake correction process by shifting an optical axis of the system such that a subject image to be imaged on an imaging field of the imager device remains still even when the camera shake changes the relative angle between the subject and the image capturing apparatus. However, because of such a shifting of the optical axis, this type of image capturing apparatuses performs corrections of the ambient brightness change, the field distortion and the chromatic aberration, etc. based on the shifted optical axis, which is apart from the read image center on the imaging field by a distance specified by the camera shake correction function.

The image capturing apparatuses are also available with a so-called electronic anti-shake function or image stabilizing function that employs an imager device having an area larger than an actually required area for image capturing to make the camera shake correction by shifting a read position of an image on the imager device when the camera shake occurs.

The image capturing apparatus having an electronic anti-shake function or image stabilizing function as described above also performs the camera shake correction by shifting the read position of the image when the camera shake changes the relative angle between the subject and the image capturing apparatus. Thus, in this type of image capturing apparatus, the ambient brightness change, the field distortion and the chromatic aberration, etc. also occurs due to the shifted optical axis position, which is apart from the read image center on the imaging field by the distance specified by the camera shake correction.

For the purpose of increasing the image quality or reducing the effect of the shifted optical axis, one type of the image capturing apparatuses of related art is provided with an anti-shake function and performs adjusting of the correction process for the ambient brightness change, for instance. More specifically, such a type of the image capturing apparatus is adapted to make an image correction by reading out correction data corresponding to an anticipated amount of camera shake based on a signal sent from camera shake detecting means at the time of driving of an image stabilizing lens, and changing an output gain with respect to the quantity of light received by each pixel in the imager device (See Japanese Patent Application Publication No. 2003-101866, for instance).

SUMMARY OF THE INVENTION

However, the above type of image capturing apparatus of related art performs the image correction based on the signal sent from the camera shake detecting means at the time of driving of the image stabilizing lens, so that pre-storage of a correction map containing correction data respectively suitable for all anticipated amounts of camera shake is required. Thus, the above type of image capturing apparatus of related art presents an issue such that a need for the prestorage of the correction map causes an increase in an the amount of correction data, leading to an increase in cost.

Particularly, in recent years, a high-resolution image capturing apparatus requiring use of a large number of pixels has been developed. This type of high-resolution image capturing apparatus requires a larger storage capacity for such correction data.

The present invention has been undertaken in view of the above issues. It is desirable to properly adjust the correction process for image information without increasing an amount of correction data.

In an embodiment of the present invention, there is provided an optical apparatus, a lens unit, and/or an image capturing apparatus. The optical apparatus, a lens unit, and/or an image capturing apparatus includes an optical imaging system having an image stabilizing lens, the image stabilizing lens being configured so as to be shifted in directions orthogonal to an optical axis for camera shake correction; image correcting means for making an image correction for image information captured through the optical imaging system; camera shake detecting means for detecting camera shake occurring at the optical imaging system; and lens drive means for shifting the image stabilizing lens in the directions orthogonal to the optical axis based on a detection result obtained by the camera shake detecting means. Further, a center of correction to be used in the image correcting means is shifted with respect to a read image center on an imager device depending on a distance and a direction of the shifting of the image stabilizing lens, the imager device converting image information into an electric signal.

In another embodiment of the present invention, there is provided an optical apparatus, a lens unit, and/or an image capturing apparatus. The optical apparatus, a lens unit, and/or an image capturing apparatus includes: an optical imaging system having a predetermined lens; image correcting means for making a image correction for image information captured through the optical imaging system; camera shake detecting means for detecting camera shake occurring at the optical imaging system; and electronic image stabilizing means for shifting read positions of an image captured on an imager device based on a detection result obtained by the camera shake detecting means, the imager device converting image information into an electric signal. Further, a center of correction to be used in the image correcting means is shifted with respect to a read image center on the imager device depending on a distance and a direction of the shifting of the read positions of an image.

In still another embodiment of the present invention, the image correction may be performed such that correction data included in one of two areas separated from each other through a horizontal or vertical line passing through the center of correction is used to obtain correction data for the other of the two areas.

In another embodiment of the present invention, image correction may be performed such that correction data included in one of four areas separated from one another through horizontal and vertical lines both passing through the center of correction is used to obtain correction data for the remaining three areas.

According to the present invention, it is possible to properly adjust the correction process for image information without increasing the amount of correction data.

BRIEF DESCRIPTION OF THE DRAWINGS

The above and other objects, features and advantages of the present invention will become more apparent from the following description of the presently-preferred exemplary embodiments of the invention taken in conjunction with the accompanying drawings, in which.

DETAILED DESCRIPTION OF THE EMBODIMENTS

The present invention is applicable to various types of image capturing apparatuses having a moving or still image capturing function, such as mobile phones, video cameras and still cameras, or to various types of lens units and optical apparatuses used for these types of image capturing apparatuses.

First, an overall configuration of an image capturing apparatus 1 is described with reference to FIG. 1.

The image capturing apparatus 1 has a camera block 2, a camera DSP (Digital Signal Processor) 3, a SDRAM (Synchronous Dynamic Random Access Memory) 4, a media interface 5, a control block 6, an operation section 7, a LCD (Liquid Crystal Display) 8, and an external interface 9. The image capturing apparatus 1 permits detachable mounting of a recording medium 100 to the image capturing apparatus.

The recording medium 100 is available in various types of recording media, including a so-called memory card involving the use of a semiconductor memory and a disk-shaped recording medium such as a recordable DVD (Digital Versatile Disk) and a recordable CD (Compact Disk).

The camera block 2 may have an image stabilizing unit 10, an imager device 11 such as a CCD (Charge Coupled Device), an A/D conversion circuit 12, a first driver 13, a second driver 14, and a timing generation circuit 15.

Figure 2:
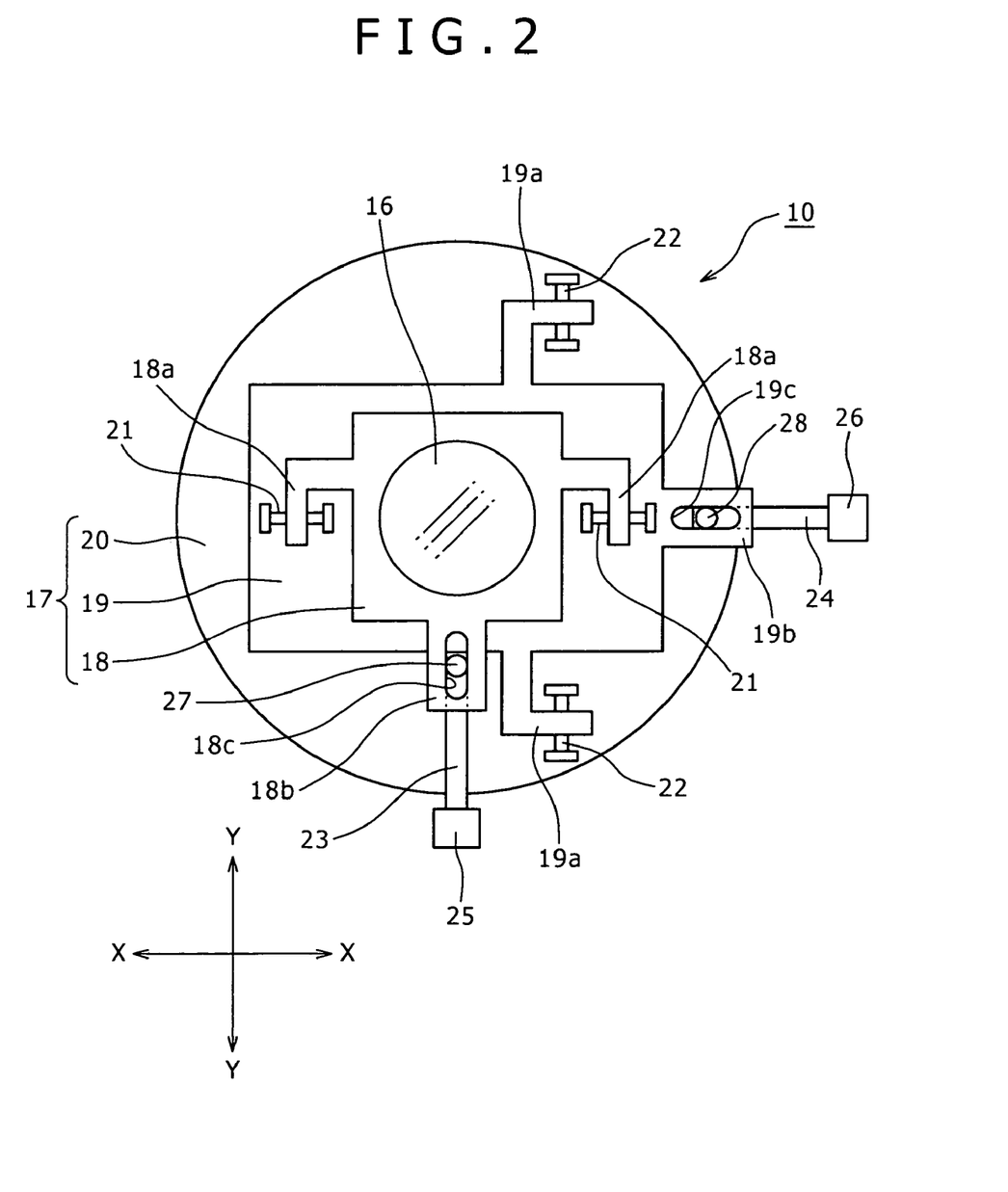
FIG. 2 is an enlarged front view showing a condition of each piezoelectric device before its deformation, together with an image stabilizing unit.

The image stabilizing unit 10 may have an image stabilizing lens 16, a lens holder 17 that holds the image stabilizing lens 16, and the like (See FIG. 2).

The lens holder 17 may be formed with a lens holder body 18, a movable base 19 and a support base 20.

The lens holder body 18 may be fitted with the image stabilizing lens 16, and it has leftward and rightward projecting arms 18a. The lens holder body 18 may also have a downward extending projection 18b, and the projection 18b has a vertically long support hole 18c.

The movable base 19 has upward and downward projecting arms 19a, for instance. The movable base 19 also has a rightward extending projection 19b, and the projection 19b has a laterally long slide hole 19c, for instance. The movable base 19 further has leftward and rightward extending support shafts 21, in which arms 18a of the lens holder body 18 are slidably support with the respective support shafts 21. Accordingly, the lens holder body 18 is adaptable so as to be shifted leftwards and rightwards (i.e., the X-direction shown in FIG. 2) with respect to the movable base 19.

The support base 20 has upward and downward extending slide shafts 22, in which the arms 19a of the movable base 19 are slidably supported with the respective slide shafts 22. Accordingly, the movable base 19 is adaptable so as to be shifted upwards and downwards (i.e., the Y-direction shown in FIG. 2) with respect to the support base 20. When the movable base 19 is shifted in the Y-direction with respect to the support base 20, the lens holder body 18 may be also shifted in the Y-direction as an integral part of the movable base 19.

The support base 20 is secured in position within a lens barrel (not shown in the figure).

Figure 1:
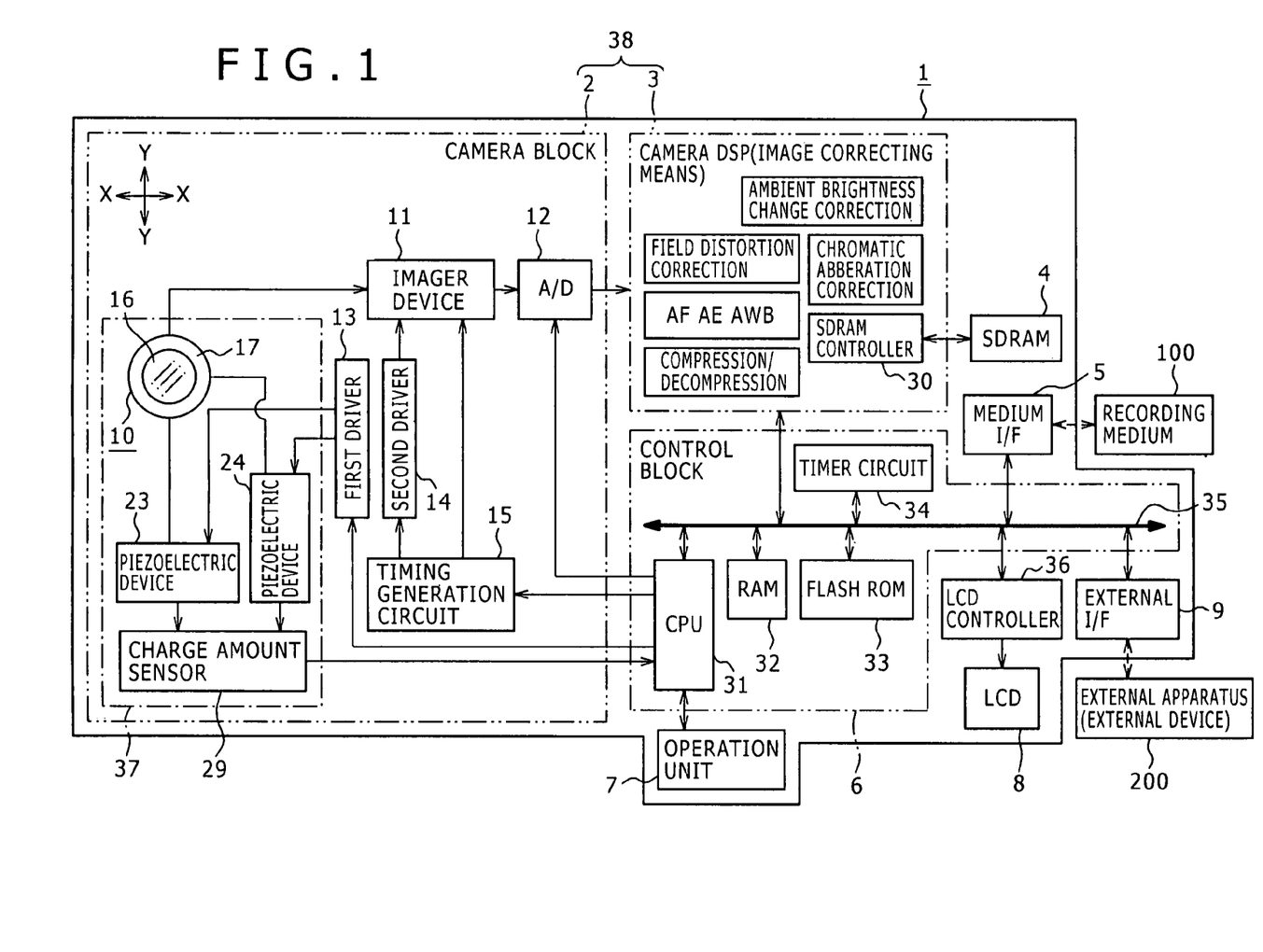
FIG. 1 is a block diagram showing an overall configuration of an image capturing apparatus.

As shown in FIG. 1, the imager device 11 operates in response to a drive signal sent from the second driver 14 to capture a subject image obtained by capturing through an optical imaging system including the image stabilizing lens 16, and then it sends the captured subject image (image information) in the form of an electric signal to the A/D conversion circuit 12 based on a timing signal outputted from the timing generation circuit 15 controlled by the control block 6.

It is to be noted that the imager device 11 is not limited to the CCD, and other types of devices, such as a CMOS (Complementary Metal-Oxide Semiconductor) may also be used as the imager device 11.

The A/D conversion circuit 12 holds a satisfactory S/N ratio resulting from execution of CDS (Correlated Double Sampling) processing to the received image information in the form of the electric signal, controls a gain by execution of AGC (Automatic Gain control) processing to the above image information, and generates image data in the form of a digital signal resulting from execution of A/D (Analog/Digital) conversion to the above image information, and the like.

The first driver 13 sends a drive signal to piezoelectric devices based on a command from a CPU in the control block 6. The piezoelectric devices and the CPU will be described in detail below.

The second driver 14 sends the drive signal to the imager device 11 based on the signal from the timing generation circuit 15.

The timing generation circuit 15 generates, depending on control by the control block 6, the timing signal that provides a prescribed timing.

The camera block 2 has piezoelectric devices 23 and 24 that may function as a lens drive means for shifting the image stabilizing unit 10 in the X- and Y-directions (See FIG. 2) orthogonal to an optical axis. Specifically, the piezoelectric device 23 functions as the lens drive means for shifting the image stabilizing unit 10 in the X-direction, for instance, while the piezoelectric device 24 functions as the lens drive means for shifting the image stabilizing unit 10 in the Y-direction, for instance.

Energizing the piezoelectric devices 23 and 24 causes each piezoelectric device to be deformed, keeping its approximate radius of curvature constant. At this time, an accumulation of a charge into the piezoelectric devices 23 and 24 is made. The piezoelectric devices 23 and 24 are respectively deformed in directions corresponding to the X- and Y-directions, with their respective one ends secured to fixed portions 25 and 26. The fixed portions 25 and 26 may be both placed on the support base 20, or alternatively, the fixed portion 25 may be on the movable base 19 with the fixed portion 26 on the support base 20.

While the piezoelectric devices 23 and 24 are available in two general categories, that is, bimorph and unimorph. The camera block 2 may use the bimorph piezoelectric devices 23 and 24, for instance. It is to be noted that unimorph piezoelectric devices may also be used as the piezoelectric devices 23 and 24.

As shown in FIG. 2, the respective other ends of the piezoelectric devices 23 and 24 are fitted with engagement pins 27 and 28, in which the engagement pins 27 and 28 are slidably supported with the support hole 18c of the lens holder body 18 and the slide hole 19c of the movable base 19, respectively.

The camera block 2 has a charge amount sensor 29. The charge amount sensor 29 detects an amount of charge accumulated in the piezoelectric devices 23 and 24, and it is incorporated in a non-illustrated detection circuit, for instance. Output from the charge amount sensor 29 is supplied to the CPU in the control block 6.

The camera DSP 3 performs signal processing, such as AF (Auto Focus), AE (Auto Exposure), and AWB (Auto White Balance), to the image data received from the A/D conversion circuit 12. The image data having undergone the signal processing, such as AF, AE and AWB is given data compression in a prescribed fashion, before being outputted to the recording medium 100 through the control block 6 for recording of the image data in the form of a file onto the recording medium 100.

The camera DSP 3 has a SDRAM controller 30, in which reading and writing of data with respect to the SDRAM 4 may be performed at high speed according to a command from the SDRAM controller 30.

The camera DSP 3 may also function as an image correcting means for making an image correction for the image information captured through the optical imaging system. The above image correction is performed to prevent image quality from degradations resulting from an ambient brightness change that a brightness reduces as a distance from a read image center increases, a field distortion that an amount of distortion increases as the distance from the read image center increases, and a chromatic aberration that a position and a size of an image change as the distance from the read image center increases.

It should be noted that, in the present specification, the term "a read image center" means a center position of an image, which is captured by the imager device and read out as the image information.

The control block 6 is a microcomputer having a configuration obtained by interconnection of sections, such as a CPU (Central Processing Unit) 31, a RAM (Random Access Memory) 32, a flash ROM (Read Only Memory) 33, and a timer circuit 34, through a system bus 35. The control block 6 provides a function of controlling each section of the image capturing apparatus 1.

The CPU 31 sends a command signal to the first driver 13 and to the second driver 14, etc. through the timing generation circuit 15 to bring these sections into operation. To the CPU 31 is supplies information about the amount of charge detected with the charge amount sensor 29 as the amount of accumulated charge in the piezoelectric devices 23 and 24 and the CPU 31 causes the output of the command signal to the first driver 13 based on the received charge amount information.

Figure 3:
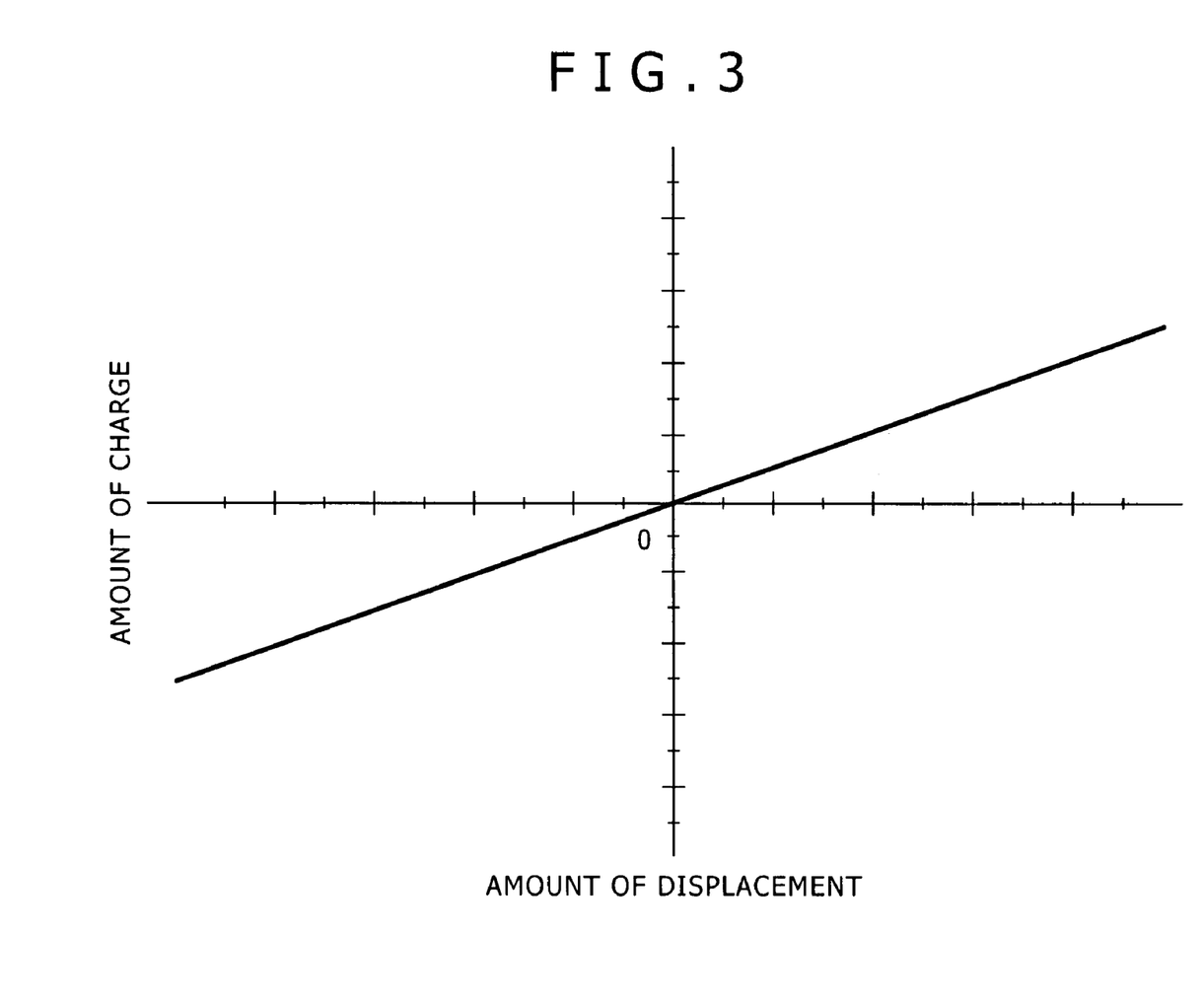
FIG. 3 is a graph showing a relationship between an amount of displacement of the piezoelectric devices and an amount of charge detected with a charge amount sensor.

FIG. 3 is a graph showing a relationship between an amount of displacement (deformation) of the piezoelectric devices 23 and 24 and the amount of charge detected with the charge amount sensor 29.

As shown in FIG. 3, the amount of displacement of the piezoelectric devices 23 and 24 is proportional to the amount of charge accumulated in the piezoelectric devices 23 and 24. Further, the piezoelectric devices 23 and 24 have features to ensure that when an external force is applied to these piezoelectric devices, accumulation of a charge in an amount proportional to the given external force is made.

Thus, the amount of accumulated charge occurring in the piezoelectric devices 23 and 24 due to the external force may be calculated by, after detecting the amount of accumulated charge in the piezoelectric devices 23 and 24, subtracting, from the detected amount of accumulated charge, an amount of charge injected into or emitted from the piezoelectric devices 23 and 24 depending on an applied drive voltage. It is to be noted that application of a drive voltage higher than an already applied drive voltage to the piezoelectric devices 23 and 24 causes the charge to be injected into the piezoelectric devices 23 and 24. On the other hand, application of a drive voltage lower than the already applied drive voltage to the piezoelectric devices 23 and 24 causes the charge to be emitted from the piezoelectric devices 23 and 24.

As described the above, use of the piezoelectric devices 23 and 24 makes it possible to estimate a magnitude of the external force applied to the image stabilizing unit 10 in terms of an inertia force produced when the camera shake occurs. In other words, it is possible to detect the amount of camera shake by detecting the amount of accumulated charge in the piezoelectric devices 23 and 24 deformed with the displacement of the image stabilizing unit 10. Thus, the piezoelectric devices 23 and 24 may function as not only the lens drive means for shifting the image stabilizing unit 10 in the X- and Y-directions but also as a camera shake detecting means for detecting the amount of camera shake occurring in the image stabilizing unit 10.

In the image capturing apparatus 1, a relationship between "a difference between the amount of charge injected into or emitted from the piezoelectric devices 23 and 24 and the amount of charge detected with the charge amount sensor 29 as the amount of accumulated charge in the piezoelectric devices 23 and 24" and "the amount of camera shake supposed to occur in the image stabilizing unit 10" is included as map information in the flash ROM 33 in advance. Thus, whenever image capturing takes place with the image capturing apparatus 1, the amount of accumulated charge in the piezoelectric devices 23 and 24 is detected with the charge amount sensor 29, and an obtained detection result is supplied as the charge amount information to the CPU 31. At this time, the above map information is read out, and the CPU 31 outputs to the first driver 13 the command signal suitable for a correction amount for correcting the amount of camera shake occurring in the image stabilizing unit 10. The CPU 31 controls the first driver 13 to output the drive signal to the piezoelectric devices 23 and 24 based on the command from the CPU 31 in order to apply a necessary drive voltage to the piezoelectric devices 23 and 24.

The RAM 32 is mainly used as a working area for temporary storage, etc. of partially completed results of processing.

Various types of programs executed in the CPU 31 and data, etc. required for each processing are stored in the flash ROM 33.

The timer circuit 34 is a circuit that outputs information, such as a present date, a present day of the week, a present time and an image capturing date.

The operation section 7 includes a touch panel and a control key, etc. that are provided on a casing of the image capturing apparatus 1. A signal suitable for an operation applied on the operation section 7 is supplied to the CPU 31, and the CPU 31 causes the output of the command signal to each section based on the received signal.

The LCD 8 is provided on the casing, for instance, and it is controlled by a LCD controller 36 connected to the system bus 35. The LCD 8 displays various types of information, such as image data obtained based on a drive signal sent from the LCD controller 36.

The external interface 9 is connected to the system bus 35. Connection to an external apparatus 200, such as an external personal computer, through the external interface 9 makes it possible to receive image data from the external personal computer for recording the received image data onto the recording medium 100, or to output image data included in the recording medium 100 to the external personal computer etc. It is to be noted that the recording medium 100 is connected to the control block 6 through the medium interface 5 connected to the system bus 35.

Further, connection to a network such as the Internet by connecting an external device 200 such as a communication module to the external interface 9 makes it possible to acquire various types of image data and other information through the network for recording of these data and information onto the recording medium 100, or to transmit data included in the recording medium 100 to an aimed destination through the network.

It is to be noted that the external interface 9 may be also installed in the form of a wire interface, such as IEEE (Institute of Electrical and Electronics Engineers) 1394 and USB (Universal Serial Bus), or alternatively, a wireless interface involving use of light and electric waves.

The image data included in the recording medium 100 is sent to the camera DSP 3 through the medium interface 5, after being read out from the recording medium 100 based on the operation signal suitable for the operation input by a user to the operation section 7.

The camera DSP 3 performs decompression processing or expansion processing on compressed data, which is the image data received in a compressed form after being read out from the recording medium 100, and then sends the decompressed image data to the LCD controller 36 through the system bus 35. The LCD controller 36 sends an image signal obtained based on the decompressed image data to the LCD 8. Thus, the LCD 8 displays an image based on the image signal received.

In the image capturing apparatus 1 having the above configuration, the optical imaging system including the image stabilizing unit 10, the piezoelectric devices 23, 24 and the charge amount sensor 29 are all specified as components of a lens unit 37 (See FIG. 1). Further, the camera block 2 and the camera DSP 3 are both specified as components of an optical apparatus 38 having the lens drive means for driving the image stabilizing lens 16, the image correcting means for making camera shake correction, and the like (See FIG. 1).

In the image capturing apparatus 1, when the drive signal is outputted from the first driver 13 to the piezoelectric devices 23 and 24 according to the command from the CPU 31 as described above, a power supply circuit (not shown in the figure) applies the drive voltage to the piezoelectric devices 23 and 24.

Figure 4:
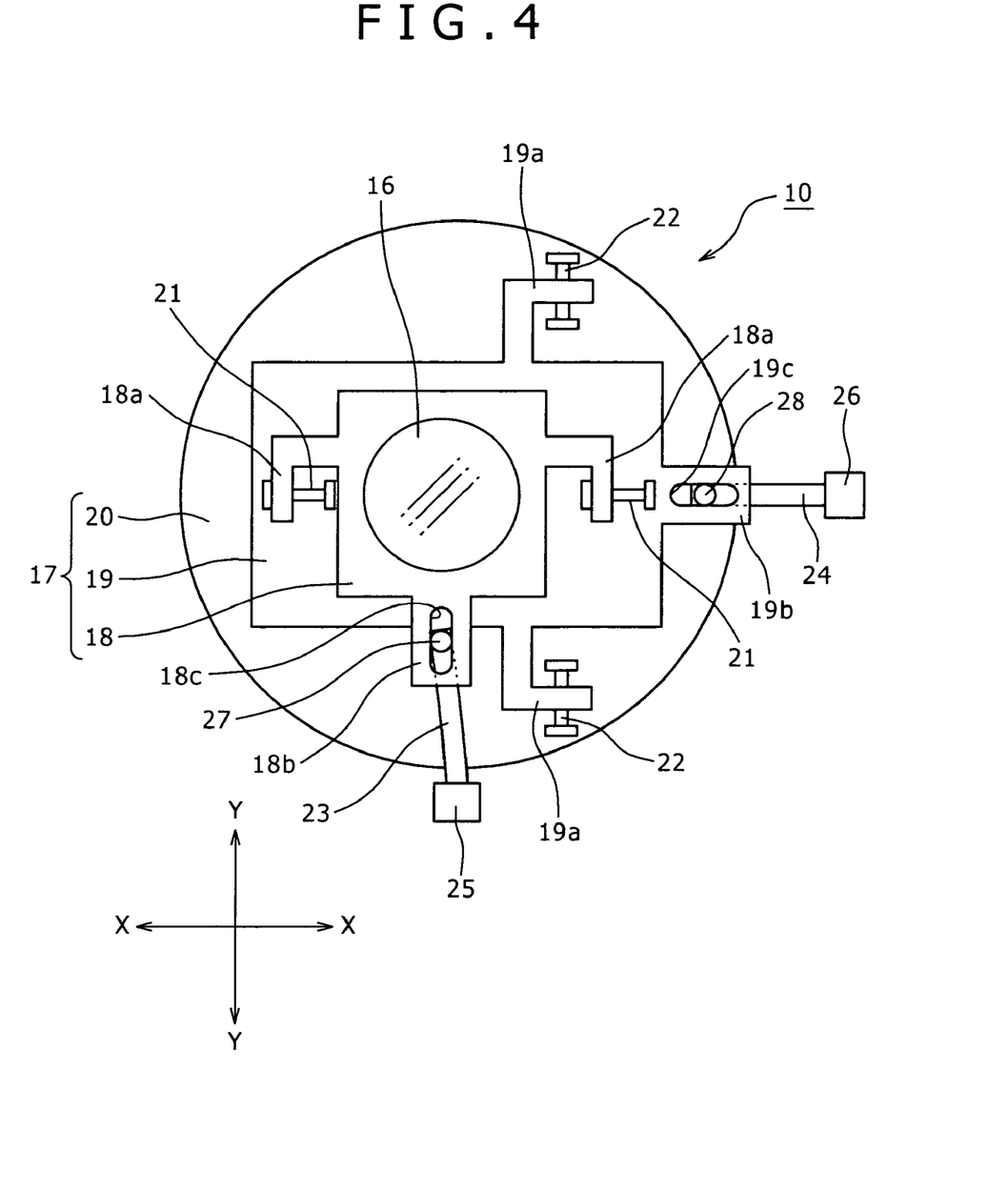
FIG. 4 is an enlarged front view showing a condition where deformation of one piezoelectric device causes the image stabilizing unit to be shifted in the X-direction.
Figure 5:
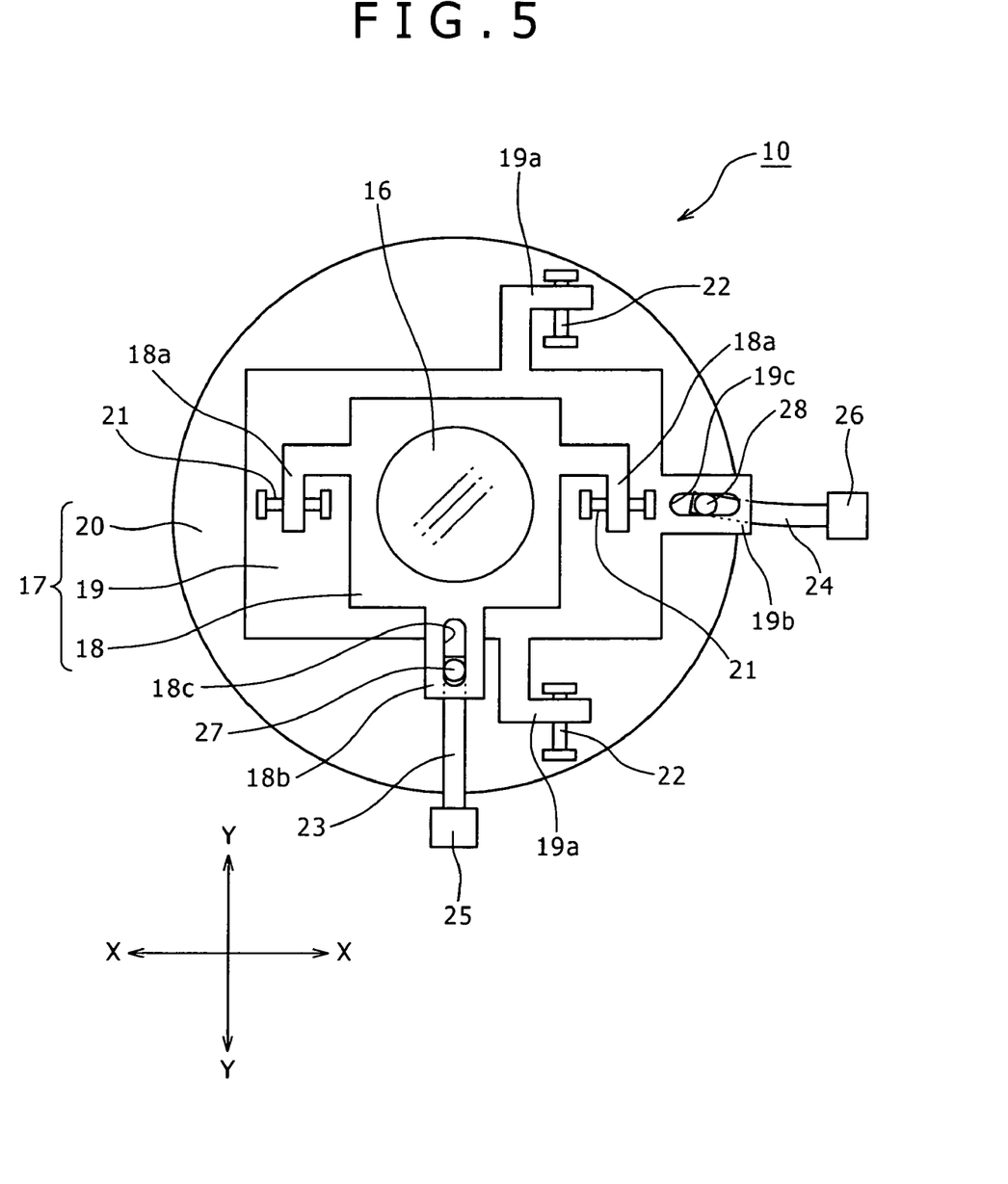
FIG. 5 is an enlarged front view showing a condition where deformation of another piezoelectric device causes the image stabilizing unit to be shifted in the Y-direction.

Application of the drive voltage to the piezoelectric devices 23 and 24 causes deformations in the piezoelectric devices 23 and 24. With the piezoelectric devices deformed, the image stabilizing unit 10 is shifted in the X- and Y-directions, thereby performing camera shake correcting actions (See FIGS. 4 and 5). At this time, the engagement pins 27 and 28 fitted to the piezoelectric devices 23 and 24 are respectively adapted to slide within the support hole 18c of the lens holder body 18 and the slide hole 19c of the movable base 19.

The camera shake correction is performed by driving the piezoelectric devices 23 and 24 as described the above so as to shift the optical axis such that the subject image on the imaging field remains still even when the camera shake changes the relative angle between the subject and the image capturing apparatus 1.

The ambient brightness change, the field distortion and the chromatic aberration may occur due to such a shifted position, which is apart from a read image center S on the imaging field of the imager device 11 by a distance specified by the camera shake correction.

Thus, in the image capturing apparatus 1, the center of correction obtained with the camera DSP 3, which serves as the image correcting means, is shifted with respect to the read image center on the imager device 11 depending on the distance and the direction of shift of the image stabilizing lens 16 so as to adjust the image correction for the image information using, as a center of correction, a shifted position, which is apart from the read image center by a distance specified by the camera shake correction.

Figure 6:
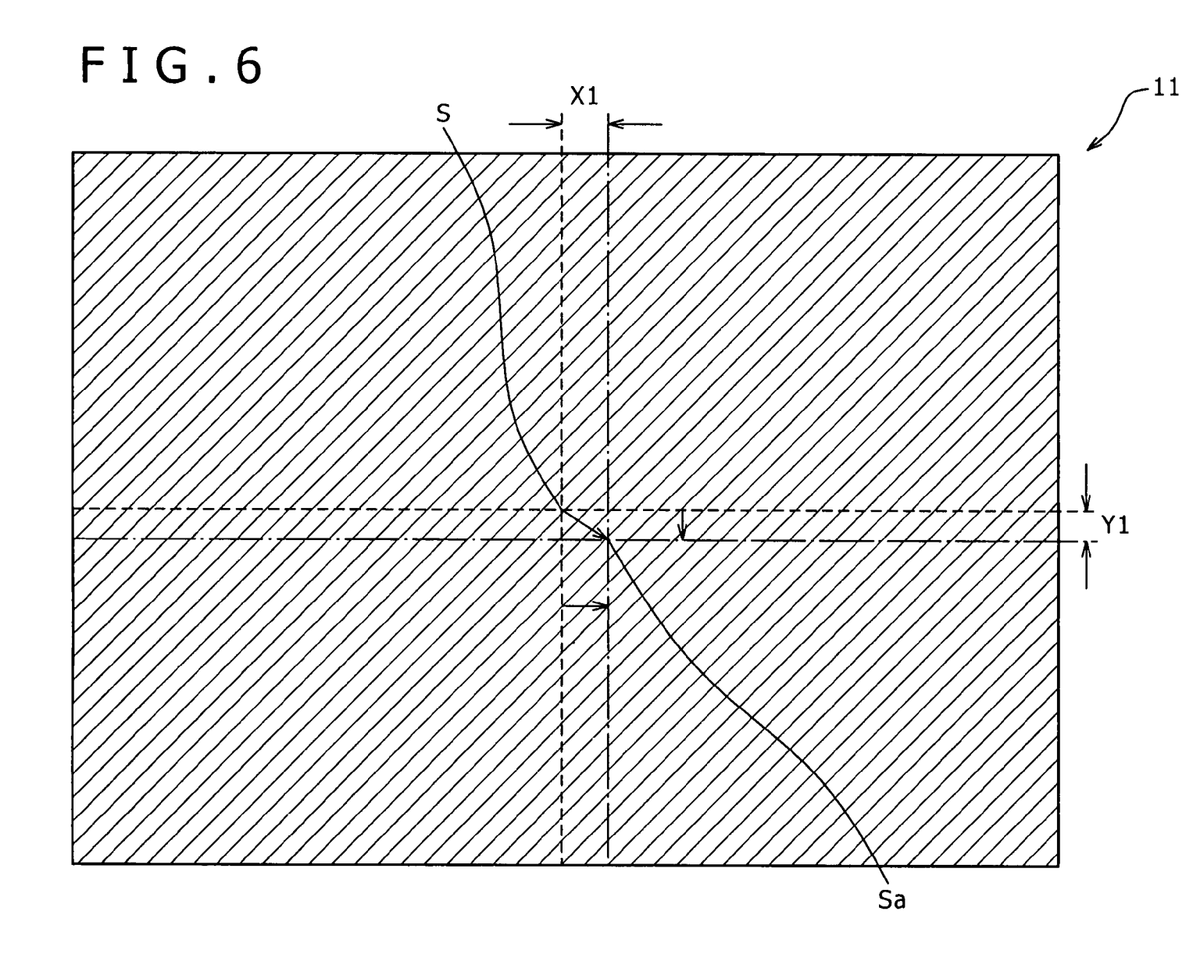
FIG. 6 is a schematic view showing one instance of a shifted center of correction obtained with respect to a read image center.

As shown in FIG. 6, for instance, when the camera shake correction causes the reference position to be shifted to a position Sa through a horizontal shift by X1 and vertical shift by Y1 with respect to the read image center S, the shifted reference position Sa is given as the center of correction for each correction suitable for the ambient brightness change, the field distortion and the chromatic aberration.

Specifically, the correction map having correction data for each pixel of the imager device 11 in accordance with the ambient brightness change, the field distortion and the chromatic aberration, all supposed to occur at the time of image capturing, is included in the flash ROM 33 in advance, for instance. Then, with the center of correction shifted with respect to the read image center S depending on the distance and the direction of shift of the image stabilizing lens 16, the correction data is read out for execution of each correction by the camera DSP 3.

The shift of the center of correction with respect to the read image center S is performed based on the output from the piezoelectric devices 23 and 24, both functioning as the above camera shake detecting means. It is to be noted that the piezoelectric devices 23 and 24 are adaptable to function as position detecting means for detecting a position of the image stabilizing unit 10, allowing to perform the shift of the center of correction with respect to the read image center S based on output from the position detecting means.

It is also to be noted that the shift of the center of correction with respect to the read image center S is preferable at the same time as the shift of the image stabilizing lens 16 in the directions orthogonal to the optical axis at the time of the camera shake correction.

Further, when the optical imaging system having the zoom lens is used, the correction data may be stored in the flash ROM 33 for each zoom position. Alternatively, when the optical imaging system having the focus lens is used, the correction data may also be stored in the flash ROM 33 for each focus position.

As described the above, the image capturing apparatus 1 is adapted to make corrections by shifting the center of correction with respect to the read image center S on the imager device 11 depending on the distance and the direction of shift of the image stabilizing lens 16, so that it is not necessary to provide the correction data suitable for all the anticipated amounts of camera shake, resulting in the attainment of a rational correction for the image information without an increase in the amount of correction data.

Although the above embodiment has been described in relation to the use of the piezoelectric devices 23 and 24 to shift the image stabilizing lens 16 in the directions orthogonal to the optical axis, it is to be noted that the means for shifting the image stabilizing lens 16 is not limited to the piezoelectric devices 23 and 24. Alternatively, other types of means, such as an electromagnetic actuator utilizing a driving coil and a driving magnet may also be used.

As the camera shake detecting means, other types of means, such as an acceleration sensor, may be used. As the position detecting means for detecting the position of the image stabilizing lens 16, other types of means, such as a MR (Magneto Resistance sensor), may be used.

Figure 7:
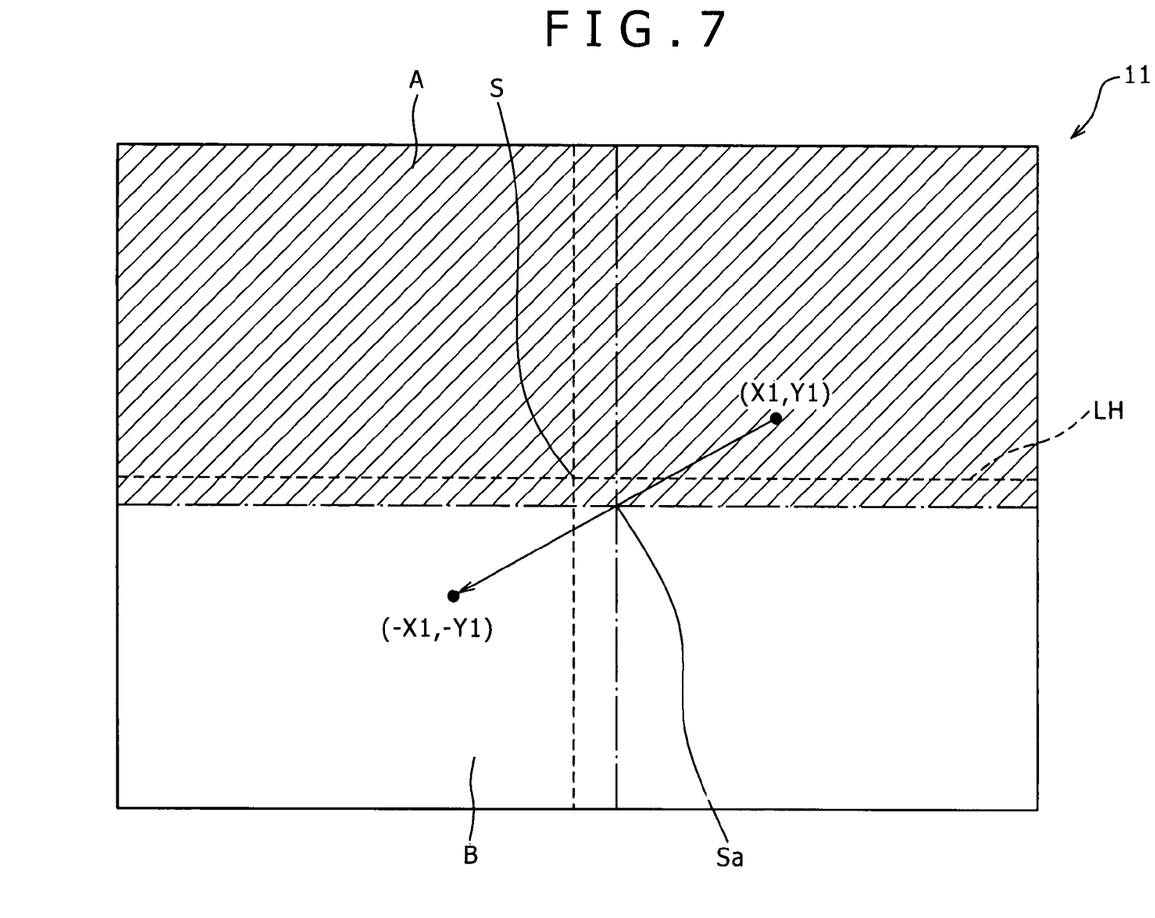
FIG. 7 is a schematic view showing one manner of making an image correction using only correction data included in one of two areas separated from each other by a horizontal line passing through a center of correction.

Although the above embodiment has been described in relation to the image correction requiring the correction data for all the pixels of the imager device 11, it is also possible to make an image correction using only correction data included in one area A (a portion shown by slant lines in FIG. 7) out of two areas separated from each other by a horizontal line LH passing through the center of correction Sa, as shown in FIG. 7.

Specifically, the ambient brightness change, the field distortion and the chromatic aberration generally have features that occur in an equivalent degree at positions of point symmetry about the read image center S, so that an address correction will do so as long as it is executed in a point symmetrical fashion. When the center of correction Sa is assumed to be an origin, for instance, correction data at a point (X1, Y1) is used as correction data with respect to the point (X1, Y1) and also as correction data at a point (−X1, −Y1) obtained through address conversion. As described above, use of each correction data in one area A as not only the correction data at each point in one area but also the correction data at each corresponding point obtained in the other area B (a portion shown without the slant line in FIG. 7) through the address conversion may reduce the correction data to half.

Figure 8:
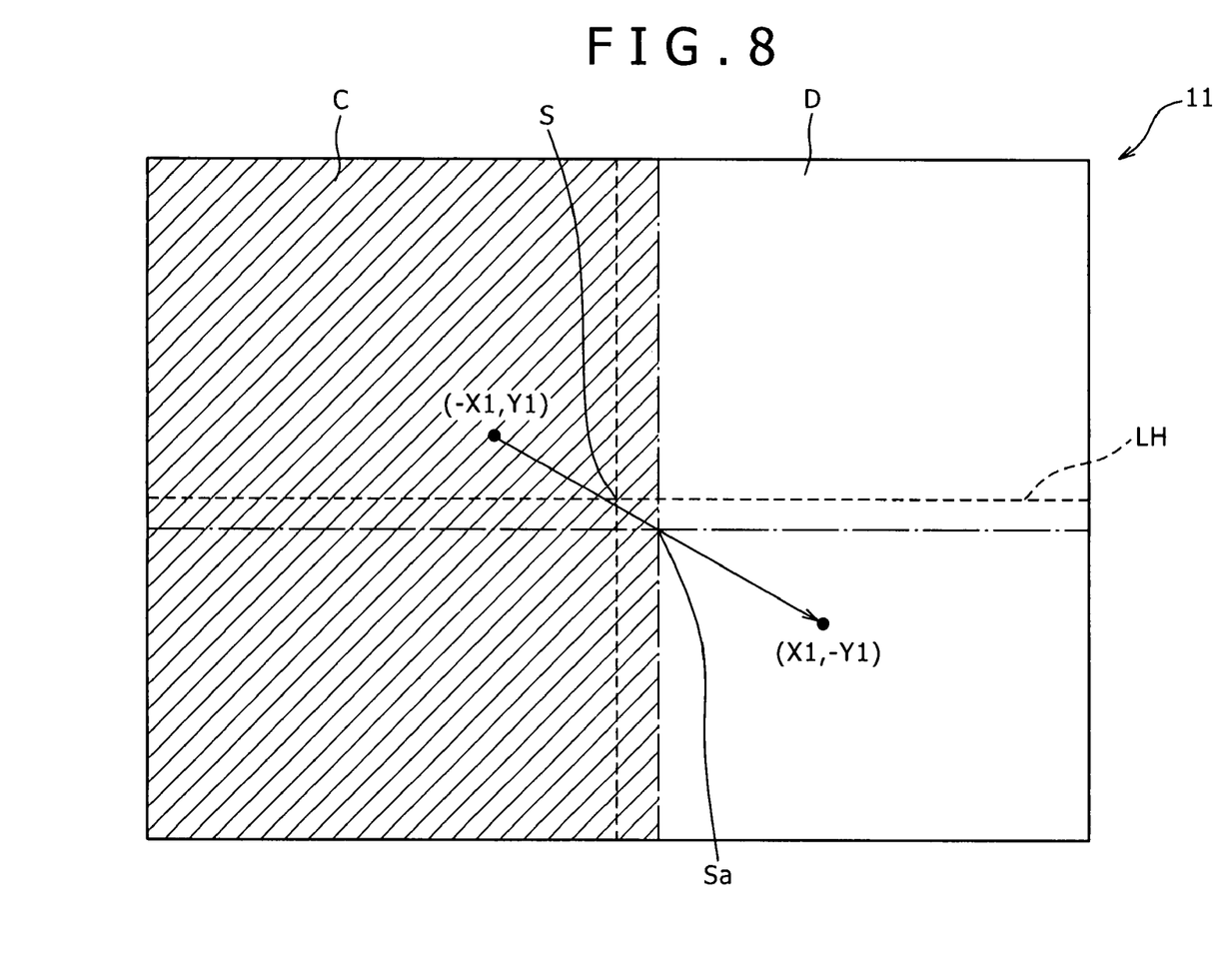
FIG. 8 is a schematic view showing one manner of making an image correction using only correction data included in one of two areas separated from each other by a vertical line passing through the center of correction.

Further, the amount of correction data may be reduced to half by using, through address conversion, correction data in one area C (a portion shown by slant lines in FIG. 8) out of two areas separated from each other by a vertical line LV passing through the center of correction Sa as correction data at each corresponding point in the other area D (a portion shown without the slant line in FIG. 8) as shown in FIG. 8. For example, when the center of correction Sa is assumed to be the origin, correction data at a point (−X1, Y1) is used as correction data with respect to the point (−X1, Y1) as well as correction data at a point (X1, −Y1) obtained through the address conversion.

Figure 9:
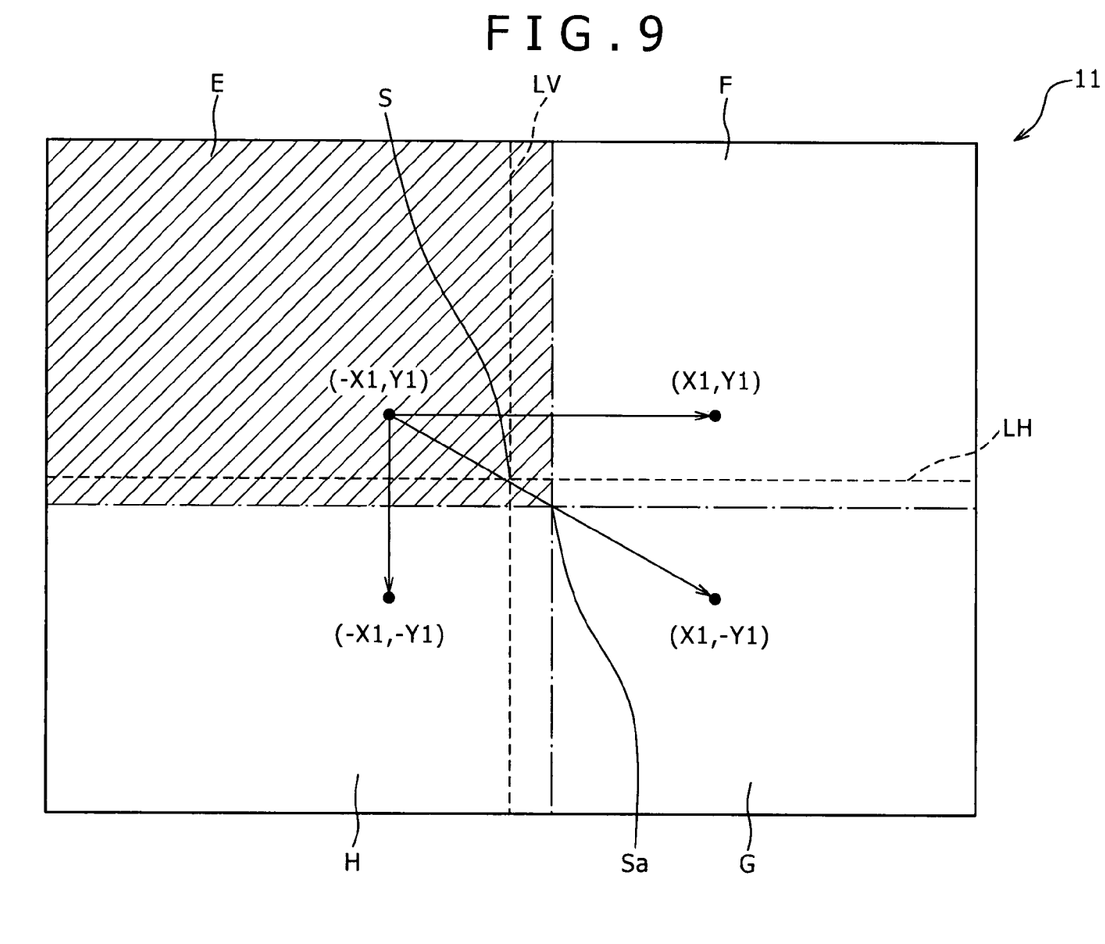
FIG. 9 is a schematic view showing one manner of making an image correction using only correction data included in one of four areas separated from one another by the horizontal and vertical lines both passing through the center of correction.

Further, the amount of correction data may be reduced to one fourth by using, through the address conversion, correction data in one area E (a portion shown by slant lines in FIG. 9) among four areas separated from one another through the horizontal and the vertical lines LH and LV both passing through the center of correction Sa also as correction data at each corresponding point obtained in the remaining three areas F, G, H (portions shown without the slant line in FIG. 9) as shown in FIG. 9. For example, when the center of correction Sa is assumed to be the origin, correction data at a point (−X1, Y1) is used as correction data with respect to the point (−X1, Y1) as well as correction data at points (X1, Y1), (X1, −Y1) and (−X1, −Y1), all obtained through the address conversion.

Although the above embodiment has been described in relation to the image capturing apparatus 1 that makes the camera shake correction by shifting the image stabilizing lens 16 in the directions orthogonal to the optical axis, it is to be noted that the present invention is also applicable to an image capturing apparatus having a so-called electronic anti-shake function or image stabilizing function that makes the camera shake correction by shifting the read position of the image on the imager device when the camera shake occurs.

The image capturing apparatus having the electronic anti-shake function or image stabilizing function performs the camera shake correction by shifting the read position of the image when the camera shake changes the relative angle between the subject and the image capturing apparatus. Accordingly, the center of correction with respect to the read image center on the imager device may be shifted depending on the distance and the direction of shift of the read position of the image.

It is to be noted that the above-described directions, such as upwards, downwards, leftwards and rightwards, are for the purpose of description and not of limitation in the application of the present invention.

The present invention contains subject matter related to Japanese Patent Application JP 2005-119845 filed in the Japanese Patent Office on Apr. 18, 2005, the entire contents of which are being incorporated herein by reference.

Any of the specific forms and structures of the sections shown in the above preferred embodiments is only for the purpose of illustrating some embodiments in carrying out the present invention, and it is to be understood that the technical scope of the present invention is construed without being limited by any of the above forms and structures.

What is claimed is:

1. An optical apparatus comprising:
   an optical imaging system having an image stabilizing lens, the image stabilizing lens being configured to be shifted in directions orthogonal to an optical axis for camera shake correction;
   image correcting means for making an image correction for image information captured through the optical imaging system;
   an imager device configured to convert the image information obtained through the optical imaging system into an electric signal;
   camera shake detecting means for detecting camera shake occurring at the optical imaging system; and
   lens drive means for shifting the image stabilizing lens in the directions orthogonal to the optical axis based on a detection result obtained by the camera shake detecting means;
   wherein detecting the camera shake by the camera shake detecting means and shifting the image stabilizing lens by the lens drive means are both performed based upon output from a plurality of piezoelectric devices, and
   wherein a center of correction to be used in the image correcting means is shifted with respect to a read image center on the imager device depending on a distance and a direction of the shifting of the image stabilizing lens.

2. The optical apparatus according to claim 1, wherein:
   the image correction is performed such that correction data included in one of two areas separated from each other through a horizontal or vertical line passing through the center of correction is used to obtain correction data for the other of the two areas.

3. The optical apparatus according to claim 1, wherein:
   the image correction is performed such that correction data included in one of four areas separated from one another through horizontal and vertical lines both passing through the center of correction is used to obtain correction data for the remaining three areas.

4. An optical apparatus comprising:
   an optical imaging system having a predetermined lens;
   image correcting means for making an image correction for image information captured through the optical imaging system wherein the image correction is performed such that correction data included in one of two areas separated from each other through a horizontal or vertical line passing through the center of correction is used to obtain correction data for the other of the two areas;
   an imager device configured to convert the image information obtained through the optical imaging system into an electric signal;
   camera shake detecting means for detecting camera shake occurring at the optical imaging system; and
   electronic image stabilizing means for shifting read positions of an image captured on the imager device based on a detection result obtained by the camera shake detecting means;
   wherein a center of correction to be used in the image correcting means is shifted with respect to a read image center on the imager device depending on a distance and a direction of the shifting of the read positions of an image.

5. An optical apparatus comprising:
   an optical imaging system having a predetermined lens;
   image correcting means for making an image correction for image information captured through the optical imaging system wherein the image correction is performed such that correction data included in one of four areas separated from one another through horizontal and vertical lines both passing through the center of correction is used to obtain correction data for the remaining three areas;
   an imager device configured to convert the image information obtained through the optical imaging system into an electric signal;
   camera shake detecting means for detecting camera shake occurring at the optical imaging system; and
   electronic image stabilizing means for shifting read positions of an image captured on the imager device based on a detection result obtained by the camera shake detecting means;
   wherein a center of correction to be used in the image correcting means is shifted with respect to a read image center on the imager device depending on a distance and a direction of the shifting of the read positions of an image.

6. A lens unit, comprising:
   an optical imaging system having an image stabilizing lens, the image stabilizing lens being configured to be shifted in directions orthogonal to an optical axis for camera shake correction;
   image correcting means for making an image correction for image information captured through the optical imaging system;
   camera shake detecting means for detecting camera shake occurring at the optical imaging system; and
   lens drive means for shifting the image stabilizing lens in the directions orthogonal to the optical axis based on a detection result obtained by the camera shake detecting means;
   wherein detecting the camera shake by the camera shake detecting means and shifting the image stabilizing lens by the lens drive means are both performed based upon output from a plurality of piezoelectric devices, and
   wherein a center of correction to be used in the image correcting means is shifted with respect to a read image center on an imager device depending on a distance and a direction of the shifting of the image stabilizing lens, the imager device converting image information into an electric signal.

7. A lens unit, comprising:
   an optical imaging system having a predetermined lens;
   image correcting means for making an image correction for image information captured through the optical imaging system wherein the image correction is performed such that correction data included in one of two areas separated from each other through a horizontal or vertical line passing through the center of correction is used to obtain correction data for the other of the two areas;
   camera shake detecting means for detecting camera shake occurring at the optical imaging system; and
   electronic image stabilizing means for shifting read positions of an image captured on an imager device based on a detection result obtained by the camera shake detecting means, the imager device converting image information into an electric signal;
   wherein a center of correction to be used in the image correcting means is shifted with respect to a read image center on the imager device depending on a distance and a direction of the shifting of the read positions of an image.

8. An image capturing apparatus having a camera block for capturing an image of a subject, the apparatus comprising:
- an optical imaging system having an image stabilizing lens, the image stabilizing lens being configured to be shifted in directions orthogonal to an optical axis for camera shake correction;
- image correcting means for making an image correction for image information captured through the optical imaging system;
- an imager device configured to convert the image information obtained through the optical imaging system into an electric signal;
- camera shake detecting means for detecting camera shake occurring at the optical imaging system; and
- lens drive means for shifting the image stabilizing lens in the directions orthogonal to the optical axis based on a detection result obtained by the camera shake detecting means;
- wherein detecting the camera shake by the camera shake detecting means and shifting the image stabilizing lens by the lens drive means are both performed based upon output from a plurality of piezoelectric devices, and
- wherein a center of correction to be used in the image correcting means is shifted with respect to a read image center on the imager device depending on a distance and a direction of the shifting of the image stabilizing lens.

9. An image capturing apparatus having a camera block for capturing an image of a subject, the apparatus comprising:
- an optical imaging system having a predetermined lens;
- image correcting means for making an image correction for image information captured through the optical imaging system wherein the image correction is performed such that correction data included in one of two areas separated from each other through a horizontal or vertical line passing through the center of correction is used to obtain correction data for the other of the two areas;
- an imager device configured to convert the image information obtained through the optical imaging system into an electric signal;
- camera shake detecting means for detecting camera shake occurring at the optical imaging system; and
- electronic image stabilizing means for shifting read positions of an image captured on the imager device based on a detection result obtained by the camera shake detecting means;
- wherein a center of correction to be used in the image correcting means is shifted with respect to a read image center on the imager device depending on a distance and a direction of the shifting of the read positions of an image.

10. An image capturing apparatus having a camera block for capturing an image of a subject, the apparatus comprising:
- an optical imaging system having an image stabilizing lens, the image stabilizing lens being configured to be shifted in directions orthogonal to an optical axis for camera shake correction;
- an image correcting section configured to make an image correction for image information captured through the optical imaging system;
- an imager device configured to convert the image information obtained through the optical imaging system into an electric signal;
- a camera shake detector configured to detect camera shake occurring at the optical imaging system; and
- a lens driver configured to shift the image stabilizing lens in the directions orthogonal to the optical axis based on a detection result obtained by the camera shake detector;
- wherein detecting the camera shake by the camera shake detector and shifting the image stabilizing lens by the lens driver are both performed based upon output from a plurality of piezoelectric devices, and
- wherein a center of correction to be used in the image correcting section is shifted with respect to a read image center on the imager device depending on a distance and a direction of the shifting of the image stabilizing lens.

11. An image capturing apparatus having a camera block for capturing an image of a subject, the apparatus comprising:
- an optical imaging system having a predetermined lens;
- an image correcting section configured to make an image correction for image information captured through the optical imaging system wherein the image correction is performed such that correction data included in one of two areas separated from each other through a horizontal or vertical line passing through the center of correction is used to obtain correction data for the other of the two areas;
- an imager device configured to convert the image information obtained through the optical imaging system into an electric signal;
- a camera shake detector configured to detect camera shake occurring at the optical imaging system; and
- an electronic image stabilizing section configured to shift read positions of an image captured on the imager device based on a detection result obtained by the camera shake detector;
- wherein a center of correction to be used in the image correcting section is shifted with respect to a read image center on the imager device depending on a distance and a direction of the shifting of the read positions of an image.

* * * * *